United States Patent
Hwang et al.

(10) Patent No.: US 8,163,426 B2
(45) Date of Patent: Apr. 24, 2012

(54) POLYSILOXANE-BASED COMPOUND FOR ELECTROLYTE OF LITHIUM SECONDARY BATTERY, ORGANIC ELECTROLYTE SOLUTION INCLUDING THE POLYSILOXANE-BASED COMPOUND, AND LITHIUM BATTERY USING THE SOLUTION

(75) Inventors: Seung-sik Hwang, Seongnam-si (KR); Young-gyoon Ryu, Suwon-si (KR); Seok-soo Lee, Suwon-si (KR); Dong-joon Lee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 892 days.

(21) Appl. No.: 12/185,301

(22) Filed: Aug. 4, 2008

(65) Prior Publication Data

US 2009/0191465 A1    Jul. 30, 2009

(30) Foreign Application Priority Data

Jan. 25, 2008   (KR) ........................ 10-2008-0008031

(51) Int. Cl.
*H01M 6/18* (2006.01)
(52) U.S. Cl. ........ 429/307; 429/313; 429/316; 429/317; 429/326; 429/324; 429/330; 429/332; 252/62.2
(58) Field of Classification Search ................... 429/307, 429/313, 316, 317, 326, 324, 330, 332; 252/62.2
See application file for complete search history.

(56) References Cited

U.S. PATENT DOCUMENTS 6,245,828 B1 * 6/2001 Weinmann et al. ........... 522/148
* cited by examiner

*Primary Examiner* — Laura Weiner
(74) *Attorney, Agent, or Firm* — Christie, Parker & Hale, LLP

(57) ABSTRACT

An additive for an electrolyte of a lithium secondary battery, the additive including a polysiloxane-based compound represented by Formula 1 below:

(Formula 1)

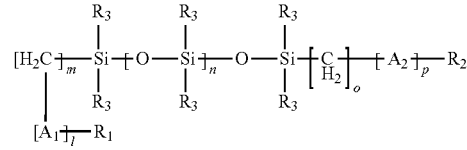

In formula 1 $R_1$, $R_2$, $R_3$, $A_1$, $A_2$, l, m, n, o and p are as described in the detailed description of the present invention.

16 Claims, 2 Drawing Sheets

POLYSILOXANE-BASED COMPOUND FOR ELECTROLYTE OF LITHIUM SECONDARY BATTERY, ORGANIC ELECTROLYTE SOLUTION INCLUDING THE POLYSILOXANE-BASED COMPOUND, AND LITHIUM BATTERY USING THE SOLUTION

CROSS-REFERENCE TO RELATED PATENT APPLICATION

This application claims the benefit of Korean Patent Application No. 2008-8031, filed on Jan. 25, 2008, in the Korean Intellectual Property Office, the disclosure of which is incorporated herein in its entirety by reference.

BACKGROUND OF THE INVENTION

1. Field of the Invention

Aspects of the present invention relate to an additive for an electrolyte of a lithium secondary battery, an organic electrolyte solution including the additive, and a lithium battery using the electrolyte solution.

2. Description of the Related Art

Batteries are used as power sources for portable electronic devices, such as video cameras, cell phones, and notebook computers. Rechargeable lithium batteries have 3 times the energy density per unit weight, as compared to a conventional lead storage battery, nickel-cadmium battery, nickel-hydrogen battery, nickel-zinc battery, or the like. Rechargeable lithium batteries can also be rapidly charged.

Lithium batteries operate at a high driving voltage, and thus, a water-based electrolyte solution having a high reactivity with lithium cannot be used therein. Generally, an organic electrolyte solution is used for lithium batteries. An organic electrolyte solution is prepared by dissolving a lithium salt in an organic solvent. Organic solvents are stable under high voltages and preferably have a high ion conductivity, a high dielectric constant, and a low viscosity.

When a carbonate-based, polar, non-aqueous solvent is used in an electrolyte solution of a lithium battery, an irreversible reaction occurs, which uses an excessive amount of charge, due to a side reaction between a carbon anode and the electrolyte solution, during an initial charging. Due to the irreversible reaction, a passivation layer, such as a solid electrolyte interface (SEI), is formed on the surface of the anode. The SEI prevents the degradation of the electrolyte solution during charging/discharging, and acts as an ion tunnel. The SEI is selectively permeable to lithium ions and is impermeable to the organic solvent. Since only lithium ions are intercalated into the carbon anode (the organic solvent is not intercalated), the collapse of the carbon anode structure is prevented. When a metal-based active material, such as silicon, is used as an anode active material for a lithium battery, a volume change of the anode is increased during the charging/discharging of the battery. The SEI must be able to withstand such a volume change, while at the same time suppressing the degradation of the electrolyte solution, during the charging/discharging.

SUMMARY OF THE INVENTION

Aspects of the present invention provide an additive for an electrolyte of a lithium secondary battery, which comprises a polysiloxane-based compound represented by Formula 1 below:

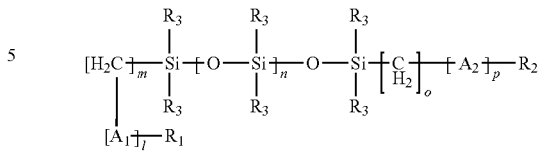

(Formula 1)

In Formula 1, $R_1$ and $R_2$ are each independently hydrogen, a halogen group, an oxirane group, an oxetane group, a cyclohexene oxide group, a thiol group, a hydroxyl group, an amino group, —COOH, —$C_6H_4$—OH, or —C(=$CH_2$)$CH_3$; a $C_1$-$C_{20}$ alkyl group substituted with hydrogen, a halogen group, an oxirane group, an oxetane group, a cyclohexene oxide group, a thiol group, a hydroxyl group, an amino group, —COOH, —$C_6H_4$—OH, or —C(=$CH_2$)$CH_3$; or a $C_6$-$C_{20}$ aryl group substituted with hydrogen, a halogen group, an oxirane group, an oxetane group, a cyclohexene oxide group, a thiol group, a hydroxyl group, an amino group, —COOH, —$C_6H_4$—OH, or —C(=$CH_2$)$CH_3$. At least one of $R_1$ and $R_2$ includes an oxirane group, an oxetane group, or a cyclohexene oxide group. $R_3$ is a $C_1$-$C_5$ alkyl group. $A_1$ and $A_2$ are each independently a $C_2$-$C_8$ alkylene oxide repeating unit, l and p are real numbers in the range of 1 to 50, m and o are integers in the range of 1 to 10, and n is an integer in the range of 1 and 30.

Aspects of the present invention also provide an organic electrolyte solution including: a lithium salt; an organic solvent; and a polysiloxane-based compound as an additive as described above.

Aspects of the present invention also provide a lithium battery including: an anode; a cathode; and an organic electrolyte solution as described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EXEMPLARY EMBODIMENTS

Figure 1:
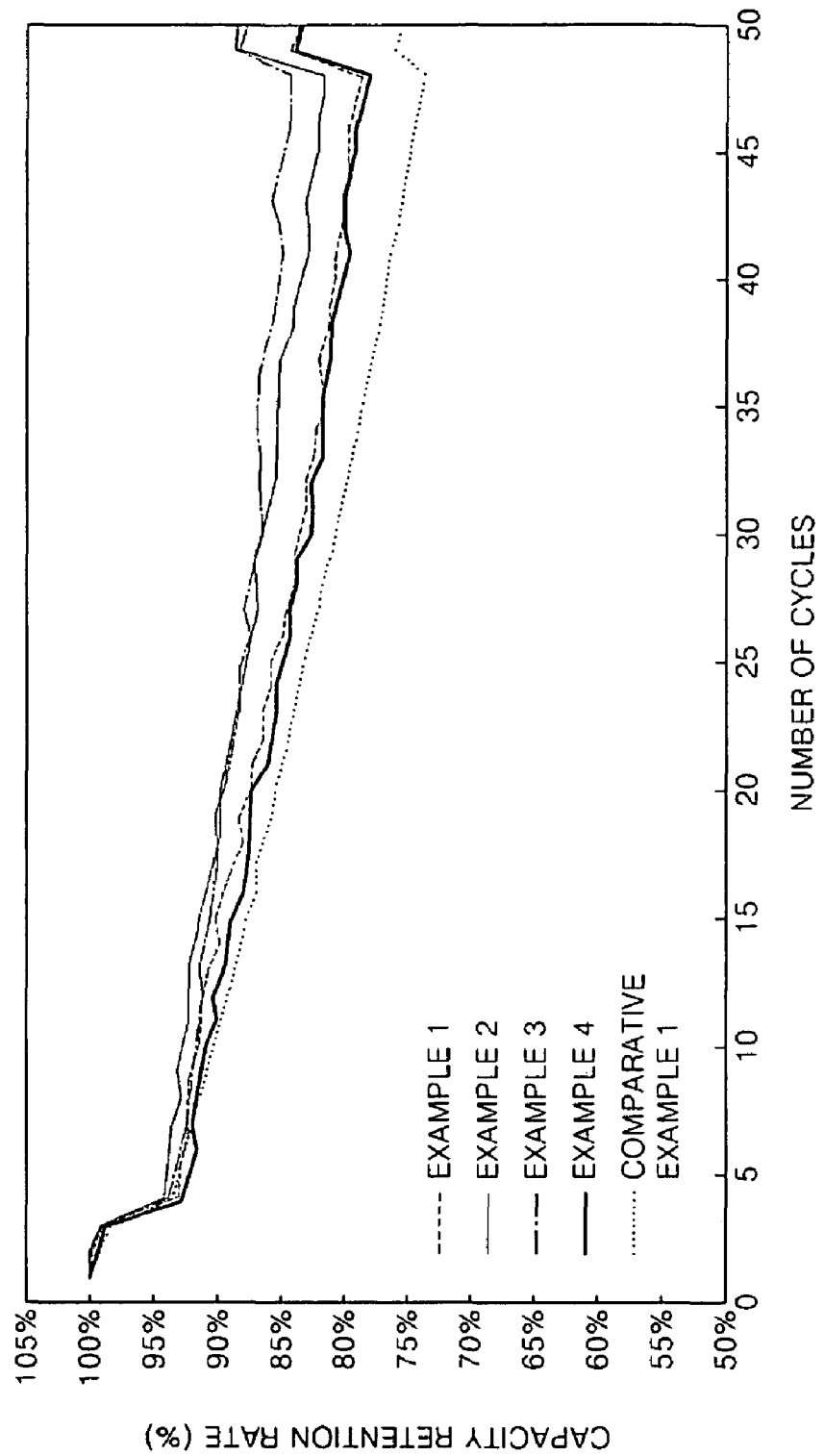
FIG. 1 is a graph illustrating the capacity retention rates of lithium batteries manufactured according to Examples 1 to 4 and Comparative Example 2 of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

According to an exemplary embodiment of the present invention, there is provided an additive for an electrolyte of a lithium secondary battery. The additive may comprise a polysiloxane-based compound represented by Formula 1 below:

(Formula 1)

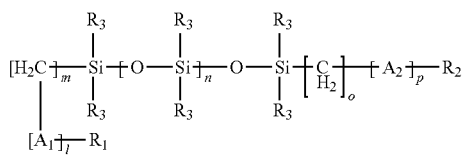

In Formula 1 R1 and R2 are each independently hydrogen, a halogen group, a halogen group, an oxirane group, an oxetane group, a cyclohexene oxide group, a thiol group, a hydroxyl group, an amino group, —COOH, —C$_6$H$_4$—OH, or —C(=CH$_2$)CH$_3$; a C$_1$-C$_{20}$ alkyl group substituted with hydrogen, a halogen group, an oxirane group, an oxetane group, a cyclohexene oxide group, a thiol group, a hydroxyl group, an amino group, —COOH, —C$_6$H$_4$—OH, or —C(=CH$_2$)CH$_3$; or a C$_6$-C$_{20}$ aryl group substituted with hydrogen, a halogen group, an oxirane group, an oxetane group, a cyclohexene oxide group, a thiol group, a hydroxyl group, an amino group, —COOH, —C$_6$H$_4$—OH, or —C(=CH$_2$)CH$_3$. At least one of R$_1$ and R$_2$ includes an oxirane group, an oxetane group, or a cyclohexene oxide group. R$_3$ is a C$_1$-C$_5$ alkyl group. A$_1$ and A$_2$ are each independently a C$_2$-C$_8$ alkylene oxide repeating unit, l and p are real numbers in the range of 1 to 50, m and o are integers in the range of 1 to 10, and n is an integer in the range of 1 and 30.

The polysiloxane-based compound includes siloxane repeating units having elasticity and flexibility, and thus, is able to effectively tolerate the volume changes of a silicon active material during the charging/discharging of the battery. The siloxane repeating units included in the polysiloxane-based compound have hydrophobic properties. It is thereby easy for the compound to be adsorbed onto the surface of the silicon active material.

The polysiloxane-based compound includes hydrophilic, alkylene oxide-based repeating units at ends of the compound. Thus, the polysiloxane-based compound includes a hydrophilic portion and a hydrophobic portion and can be considered a surfactant. Therefore, the compound can be easily adsorbed into the interface between the electrolyte and the anode.

The polysiloxane-based compound includes highly reactive, ring-type, ether groups, such as an oxirane group, an oxetane group, and/or a cyclohexene oxide group, on at least one end of the compound. The ring-type ether groups may cross-react to form a linkage with one another, during charging/discharging. As a result, a polysiloxane-based polymer film may be formed on the surface of the anode, through polymerization. The polymer film has a high binding force with an electrode surface and a high mechanical strength, and thereby can maintain a firm contact with the electrode surface.

Therefore, a volume change of an anode active material, such as silicon, that occurs during charging/discharging the battery can be accepted, while suppressing the degradation of the electrolyte solution. Thus the lifespan of the battery can be improved.

Specific examples of the C1-C20 alkyl group of Formula 1 include a methyl, an ethyl, a propyl, an isobutyl, an n-butyl, a sec-butyl, a pentyl, an iso-amyl, a hexyl, a heptyl, an octyl, a nonyl, a decyl, and a dodecyl group.

The C6-C20 aryl group of Formula 1 refers to a carbocyclic aromatic system of 6 to 20 carbon atoms having at least one aromatic ring. The ring may be fused, or may be connected through a single bond or the like. Specific examples include a phenyl group, a naphthyl group, and a biphenyl group.

According to another exemplary embodiment of the present invention, the polysiloxane-based compound may be represented by Formula 2 below:

(Formula 2)

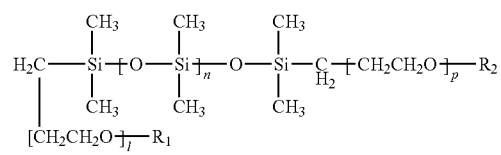

In Formula 2, l, n, p, R1, and R2 are as previously defined.

According to another exemplary embodiment of the present invention, R1 and/or R2 of the polysiloxane-based compound may each independently be selected from the following functional groups:

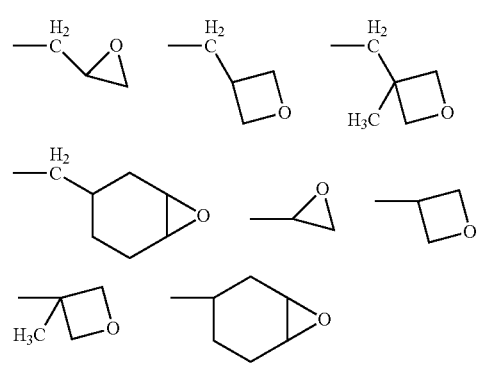

According to another exemplary embodiment of the present invention, the polysiloxane-based compound may be represented by any one of Formulae 4 to 7 below:

(Formula 4)

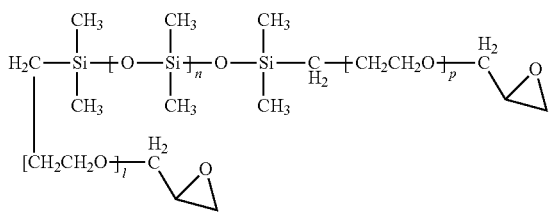

(Formula 5)

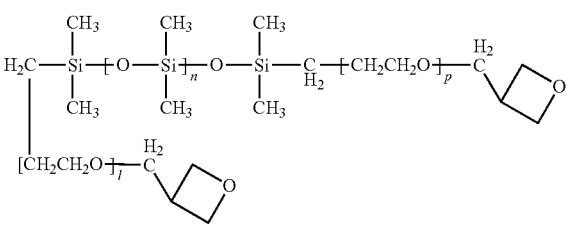

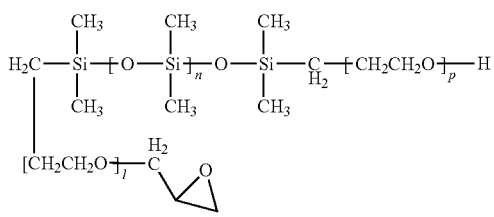

(Formula 6)

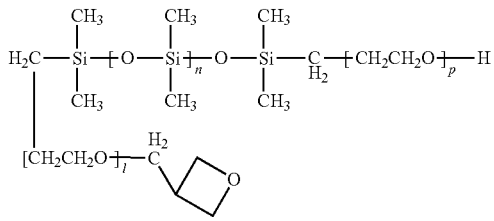

(Formula 7)

In Formulae 4-7, n is in the range of 1 to 30, and l and p are each independently in the range of 1 to 10.

An organic electrolyte solution, according to another exemplary embodiment of the present invention, includes a lithium salt; an organic solvent; and the previously described polysiloxane-based compound as an additive.

The organic electrolyte solution may include the polysiloxane-based compound in an amount of 0.1 to 5 wt %, based on the total weight of the organic electrolyte solution, but is not limited thereto.

If the lithium salt of the organic electrolyte solution includes a fluorine atom, the fluorine atom may form a covalent bond with a carbon atom. If the fluorine atom is not covalently bonded with a carbon atom, and instead forms a covalent bond with boron (B) or phosphorous (P), such as $LiBF_4$ and $LiPF_6$, fluoride ions F— are produced within the electrolyte solution. The fluoride ions react with hydroxyl groups (—OH) on the surface of a silicon active material, to produce hydrofluoric acid (HF). Hydrofluoric acid is very reactive, deteriorates the battery, and decreases the cycle-life of the battery. It is preferable that the lithium salt does not include fluorine atoms, and even if the lithium salt includes fluorine atoms, it is preferable that fluoride ions are not produced.

As long as fluoride ions are not produced, the lithium salt may be any lithium salt that is used conventionally in lithium batteries. In this regard, the lithium salt may be $LiClO_4$, $LiCF_3SO_3$, $LiN(CF_3SO_2)$, $LiC(CF_3SO_2)_3$, $LiN(C_2F_5SO_2)_2$, or mixtures thereof. The concentration of the lithium salt in the organic electrolyte solution may generally be about 0.01 to 2.0 M. If the concentration of the lithium salt is less than about 0.01M, the conductivity of the electrolyte solution decreases, weakening the performance of the electrolyte solution. If the concentration of the lithium salt is greater than about 2.0 M, the viscosity of the electrolyte solution increases, and thus, the mobility of the lithium ions may be decreased. However, using the lithium salt at a concentration outside the range of 0.5-2.0 M may also be possible.

The organic solvent in the organic electrolyte solution may be a high dielectric constant solvent, a low boiling point solvent, or a mixed solvent thereof. The high dielectric constant solvent is not particularly limited, insofar as it is used conventionally in the art, and may include cyclic carbonates, such as a fluoroethylene carbonate, an ethylene carbonate, a propylene carbonate, a butylene carbonate, and a 1-fluoroethylene carbonate; a gamma-butyrolactone, and/or mixtures thereof.

The low boiling point solvent may also be one that is conventionally used in the art, and may include chain-type carbonates, such as a dimethyl carbonate, an ethylmethyl carbonate, a diethyl carbonate, a dipropyl carbonate; a dimetoxyethane, a diethoxyethane, a fatty acid ester derivative, and/or mixtures thereof.

The mixing ratio of the of the high dielectric constant solvent to the low boiling point solvent, may generally be 1:1 to 1:9 (high dielectric constant solvent:low boiling point solvent). The range above may be used in consideration of a discharge capacity and cycle-life, but the ratio may also be outside the range above.

According to another exemplary embodiment of the present invention, there is provided a lithium battery including a cathode, an anode, and the organic electrolyte solution described above. The type of lithium battery is not particularly limited, and may be a lithium secondary battery, such as a lithium ion battery, a lithium ion polymer battery, a lithium sulfur battery, or even a lithium primary battery.

According to another exemplary embodiment of the present invention, the anode of the lithium battery may include an anode active material. The anode active material can include graphite particles and silicon microparticles.

The graphite particles and the silicon microparticles, which are included in anode active material, are not particularly limited, insofar as they are used in the art. For example, the graphite particles may be a natural graphite or an artificial graphite. The size of the graphite particles may be in a range of about 5 to 30 μm. The size of the silicon microparticles may be in a range of about 50 nm to 10 μm, but is not strictly limited thereto. The graphite particles and the silicon microparticles may be mixed using mechanical milling, for example.

Any anode active material conventionally used in the art may be used. For example, silicon metal, a silicon film, lithium metal, a lithium alloy, a carbon material, or graphite, may be used.

The lithium battery may be manufactured as follows. First, a cathode active material composition is prepared, by mixing a cathode active material, a conducting agent, a binding agent, and a solvent. A cathode plate may be manufactured by coating the cathode active material composition directly on an aluminum current collector and then drying the composition. Alternatively, the cathode plate may be manufactured by casting the cathode active material composition on a separate support, and then laminating a film, which is exfoliated from the support, onto the aluminum current collector.

The cathode active material may be a lithium-containing metal oxide, and is not limited insofar as it is used conventionally in the art. For example, the cathode active material may include $LiCoO_2$, $LiMn_xO_{2x}$ (x=1, 2), $LiNi_{1-x}Mn_xO_2$ (0<x<1), or $LiNi_{1-x-y}Co_xMn_yO_2$ (0≦x≦0.5, 0≦y≦0.5).

The conducting agent may be carbon black, and the binding agent may be a vinylidene fluoride/hexafluoropropylene copolymer, a polyvinylidene fluoride, a polyacrylonitrile, a polymethylmethacrylate, a polytetrafluoroethylene, and mixtures thereof, or a polyimide, a polyamide, an imide, a styrene butadiene rubber-based polymer, an acrylate-based rubber, sodium carboxymethylcellulose, or the like. The solvent may be N-methylpyrrolidone, acetone, water, or the like. The amounts of the cathode active material, conducting agent, binding agent, and solvent may be within ranges conventionally used in the art.

An anode active material composition is manufactured by mixing an anode active material, a conducting agent, a binding agent, and a solvent, in the same manner as for the cathode plate. An anode plate may be prepared by coating and drying the anode active material composition directly on a copper current collector, or the anode plate may be obtained by casting the anode active material composition on a separate support, and then laminating an anode active material film exfoliated from the support to the current collector. The amounts of the anode active material, conducting agent, binding agent, and solvent may be within ranges conventionally used in the art.

The anode active material may be a mixture of graphite particles and silicon microparticles. Specific properties of the graphite particles and the silicon microparticles are not particularly limited, insofar as they are conventionally used in the art. Methods of conjugating the graphite particles and the silicon microparticles are also not particularly limited, insofar as they are conventionally used in the art. In this regard, a method, such as mechanical milling, may be used to mix the graphite particles and the silicon microparticles. The conducting agent, binding agent, and solvent used for the anode active material composition may be the same as those used for the anode active material. A plasticizer may be added to the anode active material composition and the cathode active material composition, to form pores within the anode and cathode plates.

The anode and the cathode may be separated by a separator. The separator may be any conventional separator used in lithium batteries. The separator generally has a low resistance with respect to ion transport within the electrolyte and is highly impregnated with the electrolyte solution. For example, the separator may be a material selected from the group consisting of a glass fiber, a polyester, a polytetrafluoroethylene (PTFE) such as Teflon, polyethylene, polypropylene, or combinations thereof. The separator may be woven or non-woven. More specifically, a coilable separator, such as a polyethylene, or a polypropylene, may be used in the lithium ion batteries. A separator with excellent impregnation with the organic electrolyte solution may be used in the lithium ion polymer batteries.

The separator may be manufactured according to the following method. A separator composition is prepared by mixing a polymer resin, a filler, and a solvent. The separator composition can be coated directly on an electrode to form a separator film and then dried to form the separator. In the alternative, the separator composition may be cast on a support and then dried. Then the separator film can be exfoliated from the support and laminated on the electrode, to form the separator.

The polymer resin is not particularly limited and may be any material that is commonly used as a binding agent of an electrode plate. For example, the polymer resin may be a vinylidene fluoride/hexafluoropropylene copolymer, a polyvinylidene fluoride, a polyacrylonitrile, a polymethylmethacrylate, or mixtures thereof. For example, the polymer resin may be a vinylidene fluoride/hexafluoropropylene copolymer having a hexafluoropropylene content of 8 to 25 wt %. A battery structure is formed by disposing the separator between the anode plate and the cathode plate. These components may be wound or folded and placed in a cylindrical battery case, or a rectangular battery case. Then the organic electrolyte solution is injected, to complete the lithium ion battery.

In another exemplary embodiment, the battery components are stacked in a bi-cellular structure, and then the stacked structure is impregnated with the organic electrolyte solution. Then the impregnated structure is placed in a pouch, and the pouch is sealed to complete a lithium ion polymer battery.

Aspects of the present invention will now be described in more detail, with reference to the following examples. However, these examples are for illustrative purposes only and are not intended to limit the scope of the invention.

Preparation of Electrolyte Solution

Preparation Example 1

A mixture of ethylene carbonate, diethylcarbonate, and 1-fluoroethylene carbonate, in a volume ratio of 2:6:2, was prepared. Then 1.0 M $LiN(SO_2C_2F_5)_2$, as a lithium salt, and 0.5 wt % of diglycidyl ether-terminated polydimethyl siloxane (Aldrich Co.) represented by Formula 4 below, based on the total weight of organic electrolyte solution, were added to the mixture, to prepare an organic electrolyte solution.

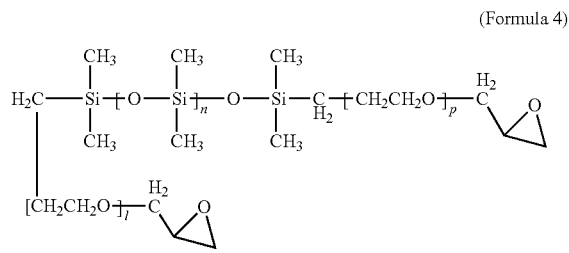

(Formula 4)

In Formula 4, l is 1, p is 1, and n is 9.

Preparation Example 2

An organic electrolyte solution was prepared using the same method as in Preparation Example 1, except that the content of the diglycidyl ether-terminated polydimethyl siloxane was changed to 1.0 wt %.

Preparation Example 3

An organic electrolyte solution was prepared using the same method as in Preparation Example 1, except that the content of the diglycidyl ether-terminated polydimethyl siloxane was changed to 3.0 wt %.

Preparation Example 4

An organic electrolyte solution was prepared using the same method as in Preparation Example 1, except that the content of the diglycidyl ether-terminated polydimethyl siloxane was changed to 5.0 wt %.

Comparative Example 1

An organic electrolyte solution was prepared using the same method as in Preparation Example 1, except that the content of the diglycidyl ether-terminated polydimethyl siloxane was not added.

Preparation of Composite Anode Active Material

Preparation Example 5

3 g of graphite particles (MCMB, Osaka Gas, Japan) with an average diameter of 25 μm and 1 g of silicon microparticles (Spherical Type, Nanostructured & Amorphous Materials, Inc., USA) with an average diameter of 100 nm were milled using a High Energy Ball Mill (SPEX, 8000M), for 60 minutes, to prepare a graphite/silicon mixture.

Preparation of Lithium Battery

Example 1

7.5 g of the mixture prepared in Preparation Example 5, as an anode active material, 1.5 g of graphite powder (SFG6, Tamcal Company), as a conducting agent, and 30 g of a binding solution including the polyvinylidene fluoride (PVdF) dissolved in N-methylpyrrolidone (NMP), at a concentration of 5 wt %, were mixed in an agate mortar to produce a slurry. The slurry was cast, using a doctor blade with a gap of 75 μm and with a thickness of 15 μm, on a copper plate. Next, the cast slurry was primarily dried in a hot-air drier at a temperature of 100° C., for 2 hours, to evaporate NMP. Then the slurry was secondarily dried in a vacuum oven at a temperature of 120° C., for 2 hours, to completely evaporate NMP. Next, the electrode formed thereby was mill-rolled to obtain an anode having a thickness of 40 μm. The anode, a lithium metal counter electrode, a polyethylene separator, and the organic electrolyte solution obtained from Preparation Example 1 were used to manufacture a 2016-sized coin cell.

Examples 2 to 4 and Comparative Example 2

Coin cells were manufactured using the same method as in Example 1, except that the organic electrolyte solutions prepared according to Preparation Examples 2 to 4 and Comparative Example 1 were used instead of the organic electrolyte solution prepared according to Preparation Example 1.

Evaluation Example 1

Evaluation of Initial Charge/Discharge Properties

Figure 2:
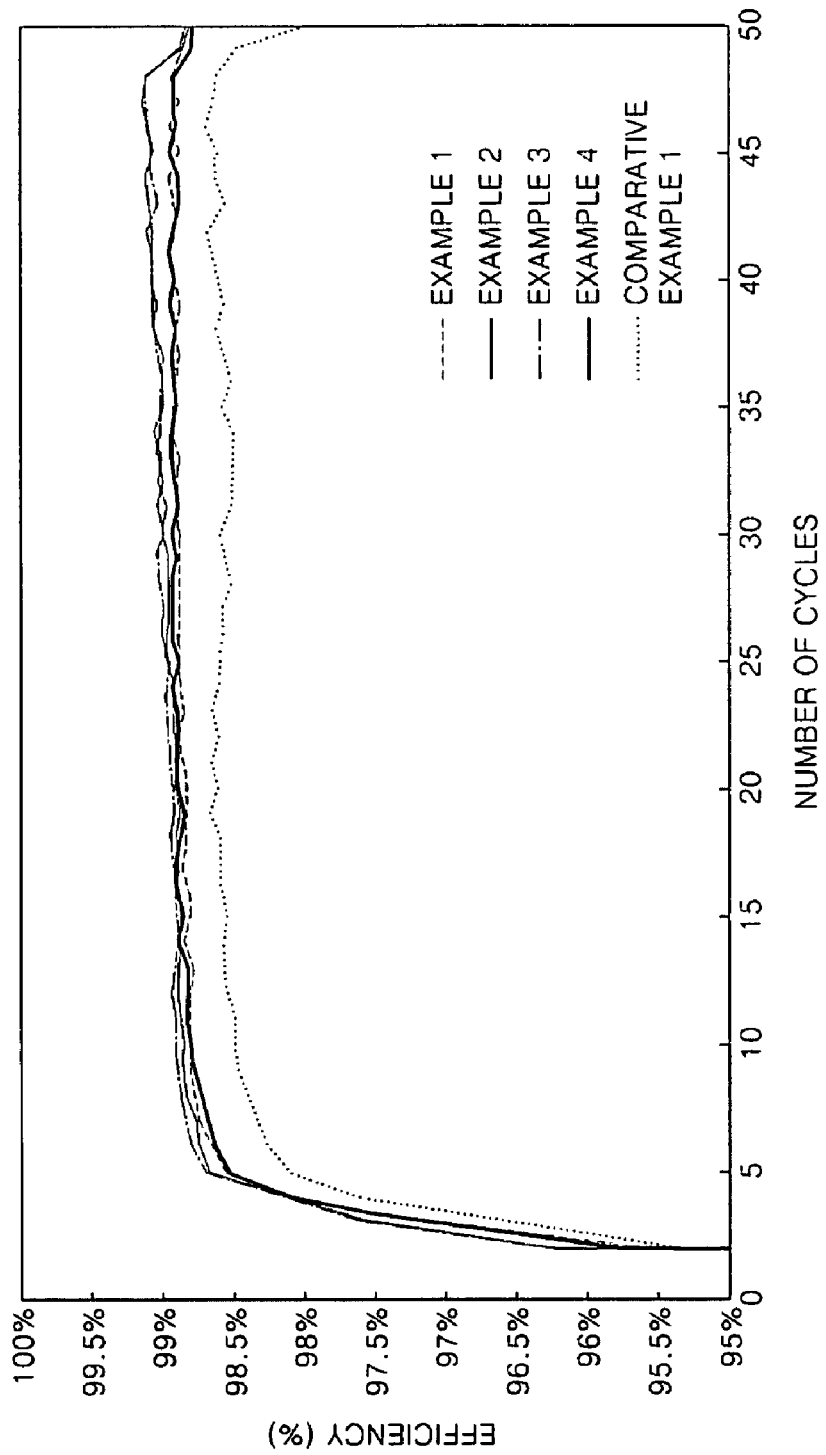
FIG. 2 is a graph illustrating the charge/discharge efficiencies of lithium batteries manufactured according to Examples 1 to 4 and Comparative Example 2.

From a first to a third cycle, the coin cells manufactured according to Examples 1 to 4 and Comparative Example 2 each were charged, at a constant current of 100 mA/g, until a voltage of 0.001 V vs. the Li electrode was reached. Then the coin cells were idled for 10 minutes, before being discharged at a constant current of 100 mA/g, until a voltage of 1.5V was reached, to obtain a charge/discharge capacity. Next, for fourth to 48th cycles, the coin cells were charged at a constant current of 200 mA/g, until a voltage of 0.001 V vs. the Li electrode was reached. Then the coin cells were idled for 10 minutes, before being discharged at a constant current of 200 mA/g, until a voltage of 1.5 V was reached, to obtain a charge/discharge capacity. Next, for 49th to 50th cycles, the coin cells were idled at 100 mA/g, until a voltage of 0.001 V vs. the Li electrode was reached. Then the coin cells were idled for 10 minutes, before being discharged at a constant current of 100 mA/g, until a voltage of 1.5V was reached, to obtain a charge/discharge capacity. The results are shown in FIGS. 1 and 2.

Charge/discharge efficiencies and capacity retention rates were calculated from the charge/discharge capacity as obtained above. The charge/discharge efficiency is represented by Equation 1 below, and the capacity retention rate is represented by Equation 2 below. The charge/discharge results at the first cycle and the capacity retention rate at the 50th cycle are shown in Table 1 below.

Initial charge/discharge efficiency [%]=discharge capacity at 1st cycle/charge capacity at 1st cycle   <Equation 1>

Capacity retention rate at 50th cycle [%]=discharge capacity at 50th cycle/discharge capacity at 1st cycle   <Equation 2>

TABLE 1

|  | Initial charge/discharge efficiency [%] | Capacity retention rate at 50th cycle [%] |
| --- | --- | --- |
| Example 1 | 67.4 | 83.7 |
| Example 2 | 68.2 | 87.9 |
| Example 3 | 68.2 | 88.5 |
| Example 4 | 67.4 | 83.5 |
| Comparative Example 2 | 67.4 | 75.6 |

Referring to Table 1, Examples 1 to 4, including the polysiloxane-based additive, had equal or better initial efficiency, and had an improved capacity retention rate at the 50th cycle, as compared to Comparative Example 2, which did not include the polysiloxane-based additive.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. An additive for an electrolyte of a lithium secondary battery, the additive comprising a polysiloxane-based compound represented by Formula 1 below:

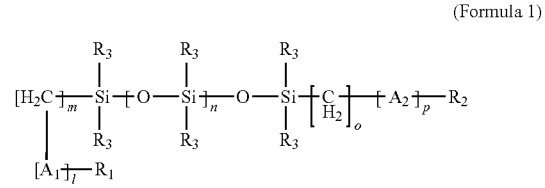

(Formula 1)

wherein:
R1 and R2 are each independently selected from the group consisting of hydrogen; a halogen group; an oxirane group; an oxetane group; a cyclohexene oxide group; a thiol group; a hydroxyl group; an amino group; —COOH; —C$_6$H$_4$—OH; —C(=CH$_2$)CH$_3$; a C1-C20 alkyl group substituted with hydrogen, a halogen group, an oxirane group, an oxetane group, a cyclohexene oxide group, a thiol group, a hydroxyl group, an amino group, —COOH, —C$_6$H$_4$—OH, or —C(=CH$_2$)CH$_3$; and a C6-C20 aryl group substituted with hydrogen, a halogen group, an oxirane group, an oxetane group, a cyclohexene oxide group, a thiol group, a hydroxyl group, an amino group, —COOH, —C$_6$H$_4$—OH, or —C(=CH$_2$)CH$_3$, at least one of R1 and R2 is selected from the group consisting of an oxirane group, an oxetane group, and a cyclohexene oxide group;

R3 is a C1-C5 alkyl group;

A1 and A2 are each independently a C2-C8 alkylene oxide repeating unit;

l and p are real numbers in the range of 1 to 50;

m and o are integers in the range of 1 to 10; and n is an integer in the range of 1 and 30.

2. The additive of claim 1, wherein the polysiloxane-based compound is represented by Formula 2 below:

(Formula 2)

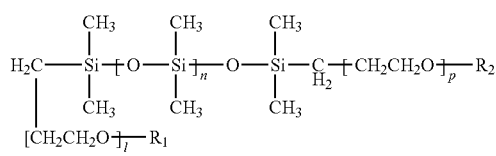

wherein l, n, p, R1 and R2 are as defined in claim 1.

3. The additive of claim 1, wherein R1 and R2 are each independently selected from the following functional groups:

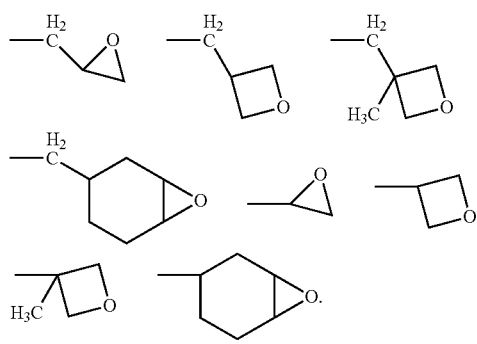

4. The additive of claim 1, wherein the polysiloxane-based compound is represented by any one of Formulae 4 to 7 below:

(Formula 4)

(Formula 5)

(Formula 6)

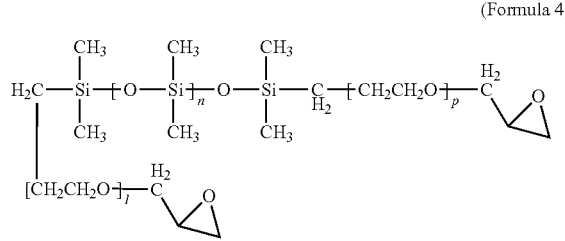

(Formula 7)

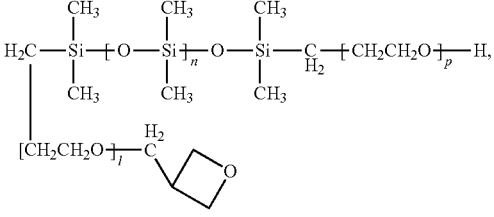

wherein n is in the range of 1 to 30, and l and p are each independently in the range of 1 to 10.

5. An organic electrolyte solution comprising:
a lithium salt;
an organic solvent; and
an additive comprising the polysiloxane-based compound of claim 1.

6. The organic electrolyte solution of claim 5, wherein the amount of the polysiloxane compound is 0.1 to 5 wt %, based on the total weight of the organic electrolyte solution.

7. The organic electrolyte solution of claim 5, wherein the lithium salt comprises a fluorine atom that is covalently bonded to a carbon atom.

8. The organic electrolyte solution of claim 5, wherein the concentration of the lithium salt in the organic electrolyte solution is 0.01 to 2.0 M.

9. The organic electrolyte solution of claim 5, wherein the organic solvent comprises at least one of a high dielectric constant solvent and a low boiling point solvent.

10. The organic electrolyte solution of claim 9, wherein the high dielectric constant solvent comprises at least one selected from the group consisting of ethylene carbonate, propylene carbonate, butylene carbonate, 1-fluoroethylene carbonate, and gamma butyrolactone.

11. The organic electrolyte solution of claim 9, wherein the low boiling point solvent comprises at least one selected from the group consisting of a dimethyl carbonate, an ethymethyl carbonate, a diethyl carbonate, a dipropyl carbonate, a dimethoxyethane, a diethoxyethane, and a fatty acid ester derivative.

12. A lithium battery comprising:
a cathode;
an anode; and
the organic electrolyte solution according to claim 5.

13. The lithium battery of claim 12, wherein the anode comprises an anode active material comprising graphite particles and silicon microparticles.

14. An organic electrolyte solution comprising:
a lithium salt;
an organic solvent; and
an additive comprising the polysiloxane-based compound of claim 2.

15. An organic electrolyte solution comprising:
a lithium salt;
an organic solvent; and
an additive comprising the polysiloxane-based compound of claim 3.

16. An organic electrolyte solution comprising:
a lithium salt;
an organic solvent; and
an additive comprising the polysiloxane-based compound of claim 4.

* * * * *